United States Patent
Frantz et al.

(10) Patent No.: US 11,163,207 B2
(45) Date of Patent: Nov. 2, 2021

(54) CHALCOGENIDE GLASS WAVEGUIDES FOR REFRACTIVE NON-MECHANICAL BEAM STEERER

(71) Applicant: The Government of the United States of America, as represented by the Secretary of the Navy, Arlington, VA (US)

(72) Inventors: Jesse A. Frantz, Washington, DC (US); Jason D. Myers, Alexandria, VA (US); Robel Y. Bekele, Washington, DC (US); Christopher M. Spillmann, Annandale, VA (US); Jawad Naciri, Herndon, VA (US); Jakub Kolacz, Washington, DC (US); Henry G. Gotjen, Washington, DC (US); Jason Auxier, Falls Church, VA (US); Leslie Brandon Shaw, Woodbridge, VA (US); Jasbinder S. Sanghera, Ashburn, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/881,225

(22) Filed: May 22, 2020

(65) Prior Publication Data

US 2020/0292911 A1    Sep. 17, 2020

Related U.S. Application Data

(62) Division of application No. 15/946,011, filed on Apr. 5, 2018, now Pat. No. 10,690,992.

(Continued)

(51) Int. Cl.
*G02F 1/29* (2006.01)
*G02F 1/01* (2006.01)
(Continued)

(52) U.S. Cl.
CPC .............. *G02F 1/292* (2013.01); *C03C 3/321* (2013.01); *C03C 13/043* (2013.01);
(Continued)

(58) Field of Classification Search
CPC ....................................................... G02F 1/292
See application file for complete search history.

(56) References Cited

U.S. PATENT DOCUMENTS 9,366,938 B1 * 6/2016 Anderson ............. G02F 1/2955
2007/0280689 A1 * 12/2007 Boffi ....................... H04J 14/02
398/65

(Continued)

OTHER PUBLICATIONS

Creekmore, Amy, "Low Absorption Liquid Crystal Materials for Midwave Infrared" (2015). Electronic Theses and Dissertations, 2004-2019. 66; (Year: 2015).*

*Primary Examiner* — Edmond C Lau
(74) *Attorney, Agent, or Firm* — US Naval Research Laboratory; Rebecca L. Forman

(57) ABSTRACT

A liquid crystal-based non-mechanical beam steering device that permits steering in the mid-wave infrared and has a chalcogenide waveguide. The waveguide core, the subcladding, or both comprise a chalcogenide glass. The liquid crystal-based non-mechanical beam steering device has a tapered subcladding and a liquid crystal layer.

5 Claims, 8 Drawing Sheets

Related U.S. Application Data

(60) Provisional application No. 62/481,734, filed on Apr. 5, 2017.

(51) Int. Cl.
*G02F 1/13* (2006.01)
*G02F 1/1337* (2006.01)
*G02F 1/295* (2006.01)
*C03C 3/32* (2006.01)
*C03C 13/04* (2006.01)
*G02F 1/1343* (2006.01)
*G02F 1/00* (2006.01)

(52) U.S. Cl.
CPC ............ *G02F 1/0018* (2013.01); *G02F 1/011* (2013.01); *G02F 1/1326* (2013.01); *G02F 1/1337* (2013.01); *G02F 1/134309* (2013.01); *G02F 1/2955* (2013.01); *G02F 1/0113* (2021.01); *G02F 2203/24* (2013.01)

(56) References Cited

U.S. PATENT DOCUMENTS

2010/0292065 A1* 11/2010 Kanatzidis ............... G02B 1/02
 501/10
2016/0356954 A1* 12/2016 Hayama ................. G02B 6/138

* cited by examiner

CHALCOGENIDE GLASS WAVEGUIDES FOR REFRACTIVE NON-MECHANICAL BEAM STEERER

PRIORITY CLAIM

The present application is a divisional application of U.S. application Ser. No. 15/946,011 filed on Apr. 5, 2018 by Jesse A. Frantz et al., entitled "CHALCOGENIDE GLASS WAVEGUIDES FOR REFRACTIVE NON-MECHANICAL BEAM STEERER," which claimed the benefit of U.S. Provisional Application No. 62/481,734 filed on Apr. 5, 2017 by Jesse A. Frantz et al., entitled "CHALCOGENIDE GLASS WAVEGUIDES FOR REFRACTIVE NON-MECHANICAL BEAM STEERER," the entire contents of each is incorporated herein by reference.

BACKGROUND OF THE INVENTION

Field of the Invention

The present invention relates to chalcogenide glass (ChG) waveguides and more specifically to ChG waveguides for use in a liquid crystal (LC) non-mechanical beam steerer.

Description of the Prior Art

The midwave infrared (MWIR) portion of the electromagnetic spectrum, typically defined as light having wavelengths ranging from 3-5 μm, is critical for a variety of application. For example, the MWIR is a critical band for the detection of a variety molecular species, which have distinct vibrational absorptions in this range. Mapping in this spectral range, e.g. in a MWIR LIDAR configuration, is potentially useful in a variety of applications such as monitoring emissions from waste sites, refineries, and other industrial facilities (Ramponi et al., "MWIR lidar systems and multiline DIAL techniques," Optical Science, Engineering and Instrumentation '97 (International Society for Optics and Photonics, 1997), pp. 256-67). In order to realize these applications, high-speed scanning of the MWIR laser source is required.

To date, beam steering has typically relied on mechanical devices such as gimbal-mounted mirrors or rotating Risley prisms which have inherent issues including large size, weight, and power (SWaP) requirements, slow scan rates, high repair and replacement costs, and short lifetimes before mechanical failure. Because of these considerations, non-mechanical technologies that can replace mechanical steerers are highly appealing.

Several technologies have previously been demonstrated for non-mechanical beam steering (NMBS), but each has significant drawbacks. Optical phased arrays (OPAs) consist of a grid of transmitters in which the relative phase of each individual element may be controlled (Sun et al., "Large-scale nanophotonic phased array," Nature 493, 195-199 (2013) and Yoo et al., "Optical phased array using high contrast gratings for two dimensional beamforming and beamsteering," Opt. Express, 21, 12238 (2013)). The linear phase across the combined wavefront may thus be adjusted, providing steering. OPAs suffer from power in side lobes resulting from diffractive effects. Further, they typically operate at a fixed wavelength, so wavelength variation within a spectral band or sub-band is not possible without multiple devices. Spatial light modulators (SLMs) have also been proposed for use in NMBS (Haellstig et al., "Laser beam steering and tracking using a liquid crystal spatial light modulator," AeroSense 2003 (International Society for Optics and Photonics, 2003), pp. 13-23). These devices are reflective arrays that achieve steering by controlling the phase at each pixel, and, like OPA's, are subject to diffractive effects. They also suffer from large chromatic dispersion and may require bulky optics for beam expansion and compression. Similarly, the use of digital light processing (DLP) chips for NMBS has been proposed (Van Kessel et al., "A MEMS-based projection display," Proc. IEEE, 86, 1687-1704 (1998)). DLPs are MEMS-based devices that rely on an array of switchable micromirrors. These devices suffer from limitations on power handling due to thermal issues and have limited maximum theoretical efficiency due to the binary operation of the micromirrors.

Polarization gratings (PGs) are another technology that has shown promise for NMBS (Kim et al., "Wide-angle nonmechanical beam steering using thin liquid crystal polarization gratings," J. D. Gonglewski, R. A. Carreras, and T. A. Rhoadarmer, eds. (2008), p. 709302). A PG-based steerer comprises 1) a passive PG with a nematic liquid crystal (LC) film that is surface aligned and UV-cured to present a permanent, continuously varying periodic polarization pattern; and 2) fast electro-optic, LC-based, half-wave polarization retarders to control the handedness of polarization incident on a passive PG. By controlling the handedness of circularly polarized light as it propagates through the PG stack, the light is steered to a selected angle. These devices, are highly efficient, with >99.5% diffraction efficiency, and have low absorption loss (<2% for visible through SWIR wavelengths) but are limited to discretized steering.

As a result of the limitations described above, none of these existing technologies on its own offers the characteristics required for agile, low SWaP and continuous steering. An alternative NMBS technology, based on an architecture first proposed by Vescent Photonics (Davis et al., "Liquid crystal waveguides: new devices enabled by >1000 waves of optical phase control," L.-C. Chien, ed. (2010), p. 76180E; Ziemkiewicz et al., "Laser-based satellite communication systems stabilized by non-mechanical electro-optic scanners," SPIE Defense+ Security (International Society for Optics and Photonics, 2016), pp. 982808-982808; and Anderson et al., "Liquid crystal waveguide for dynamically controlling polarized light," U.S. Patent Publication US 2012/0269478 (Oct. 25, 2012)), is the steerable electro-evanescent optical refractor (SEEOR). The SEEOR technology, which has been matured in the SWIR band and successfully demonstrated in the near infrared, is based on a slab waveguide design with light mainly confined within a passive high-index core and evanescently coupled into a tunable LC upper cladding. A voltage applied to the LC changes its refractive index, thus modulating the effective index of the waveguide. Careful design of the electrodes and substrate tapers allow this index change to be translated to high speed and continuous steering in two dimensions.

The following is a general description of the architecture and operation of a SEEOR. It is given for background purposes and is not specific to the invention disclosed here. FIG. 1 shows the components of a SEEOR. The substrate 122 is a polished wafer made of a material that is transparent at the design wavelength. It is optionally faceted on one or two sides to aid in input and/or output coupling. The substrate 122 may be conductive so that it can serve as the bottom electrode, or, alternately, it may have an electrode deposited on top of it. A subcladding 120 is deposited on top of the substrate 122. It serves as the lower cladding of the waveguide and must have a lower refractive index than the waveguide. The waveguide core 114 is deposited on top of the subcladding 120. It typically has uniform thickness and a higher refractive index than the subcladding 120. The taper in the subcladding 120 allows light to be coupled from the substrate 122 into the waveguide core 114. An alignment layer 110 is formed or deposited on top of the lower cladding. The LC 112 is located above this alignment layer and serves as a variable-index upper cladding. The LC 112 must have low optical absorption and scattering at the design wavelength. A coverglass 118 is located above the LC 112. The coverglass 118 is a wafer onto which the top electrodes 116 and another alignment layer 110 have been deposited. The two alignment layers 110 serve to align the LC 112 in a uniform direction.

FIG. 2 is a top view that illustrates the in-plane steering mechanism. The prismatic top electrodes are attached to power supplies 226. During operation, incident light 224 is coupled into the SEEOR through the input facet and is coupled into the waveguide core. It is primarily confined in the core and is evanescently coupled into the voltage-tuned LC. When a voltage is applied, the LC refractive index is varied in the triangular regions beneath the electrode due to rotation of molecules within the LC, producing an in-plane angular deviation. One electrode is used to steer to the right while the other is used to steer to the left. Steered light 228 exits from the wafer below the out-of-plane steering electrode 230.

FIG. 3 illustrates the out-of-plane steering mechanism. During operation, incident light 324 is coupled into the SEEOR. A coverglass 318 is located above the in-plane steering electrodes 332 and out-of-plane steering electrode 330. A power supply 326 is attached to the out-of plane steering electrode 330. The top electrode above the output facet (the out-of-plane steering electrode 330) changes the waveguide's effective index in this region. This change in effective index is translated into a change in angle when steered light 328 exits the output facet.

Using the two mechanisms (for in-plane and out-of-plane steering) described above, the output angle of light may be tuned continuously in two dimensions. SEEOR devices in the SWIR have been demonstrated with: up to 270° of ID steering; an angular field of regard (FOR) of up to 50°×15° for steering in 2D; and high speed (60 kHz). Further, they are compact (~6 cm$^3$) and have low power requirements (only mWs) (Davis et al., "Liquid crystal waveguides: new devices enabled by >1000 waves of optical phase control," L.-C. Chien, ed. (2010), p. 76180E and Ziemkiewicz et al., "Laser-based satellite communication systems stabilized by non-mechanical electro-optic scanners," SPIE Defense+Security (International Society for Optics and Photonics, 2016), pp. 982808-982808).

BRIEF SUMMARY OF THE INVENTION

The present invention provides a method for fabricating chalcogenide glass (ChG) waveguides for use in a liquid crystal (LC) non-mechanical beam steerer. It also provides a new non-mechanical beam steering apparatus that includes a ChG waveguide.

There are several advantages with the present invention. It permits the continuous, agile steering of MWIR light in a low-SWaP package. The ChG waveguides have low absorption throughout the MWIR and thus permit low optical losses. The LC alignment layer aligns the LC uniformly, has low absorption losses, and minimizes scattering losses at the LC/core interface. This technology can be used for mapping atmospheric constituents with MWIR lasers.

These and other features and advantages of the invention, as well as the invention itself, will become better understood by reference to the following detailed description, appended claims, and accompanying drawings.

BRIEF DESCRIPTION OF THE DRAWINGS

FIG. 5A shows a sample and shadow mask for chalcogenide glass taper deposition. FIG. 5B shows the taper after deposition.

DETAILED DESCRIPTION OF THE INVENTION

The prevent invention relates to SEEOR devices in which the waveguide core, subcladding, or both comprise ChG. ChGs are amorphous semiconductors that contain as a major constituent one or more of the "chalcogen" elements from group 6a of the periodic table (sulfur, selenium and tellurium), covalently bonded to network formers, such as, Ge, Sb, Ga, etc. (Zakery et al., "Optical properties and applications of chalcogenide glasses: a review," J. Non-Cryst. Solids, 330, 1-12 (2003)). They have low phonon energy in comparison to most common optical materials and can thus have transmission extending through the MWIR.

Figure 4:
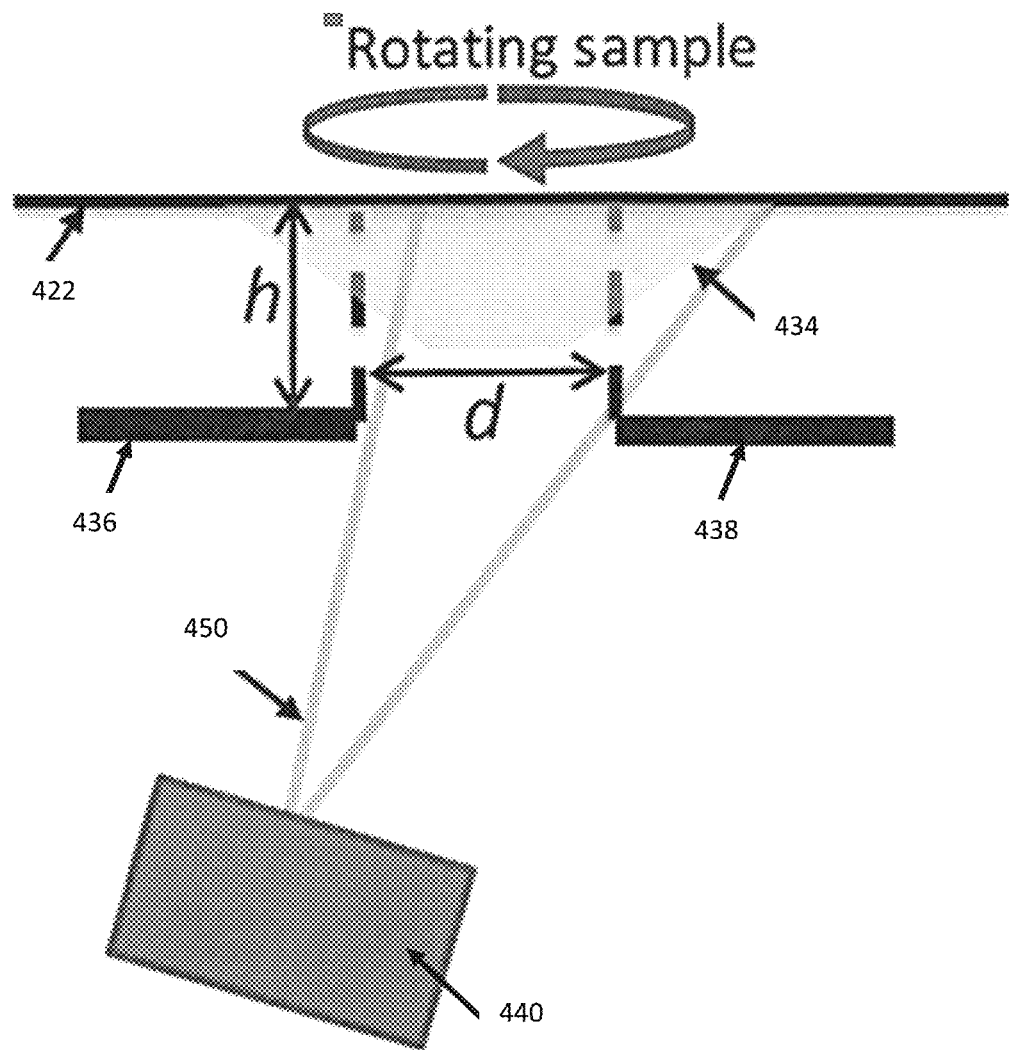
FIG. 4 is a schematic diagram of taper deposition using a shadow mask.

In one embodiment (illustrated in FIG. 4), the tapered subcladding is produced by the following method: a shadow mask with two halves (Mask 1 436 and Mask 2 438) in which the opening is a slit with a width, d, is positioned a fixed distance, h, from the substrate 422. A deposition source 440 with a flux 450 is used to deposit the subcladding. The resulting film has a film thickness profile 434 exhibiting full thickness in unobstructed areas, an S-shaped (near-linear) taper profile near the mask edge, and no deposition in positions completely shielded by the mask. The source 440 may be a thermal evaporation source, an e-beam evaporation source, or a sputter gun. The source 440 may be positioned directly below or offset from the center of the slit and may be aimed directly upward or at an angle.

Figures 5A, 5B:
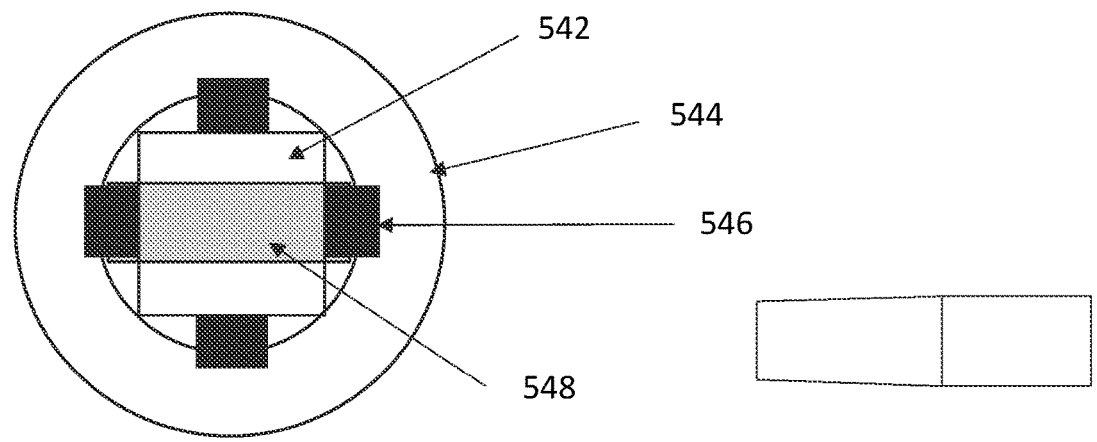
FIGS. 5A and 5B shows initial chalcogenide tapers grown via thermal evaporation.

This method was reduced to practice, and a chalcogenide taper was produced. As shown in FIG. 5A, a 4×4" soda lime glass sample 548 was mounted on a substrate holder 544. Al spacers 546 were used to position thin Mylar sheets 542 1 cm above the sample. Two pieces of Mylar were used to create a 2 cm wide opening. An approximately 2 µm thick layer of chalcogenide glass was deposited onto the sample via thermal evaporation while maintaining the substrate temperature at approximately 20° C. FIG. 5B is an image showing the sample with the taper. The uniform thickness region in the center as well as the tapered regions on the upper and lower sides are visible in the image.

Figures 6A, 6B:
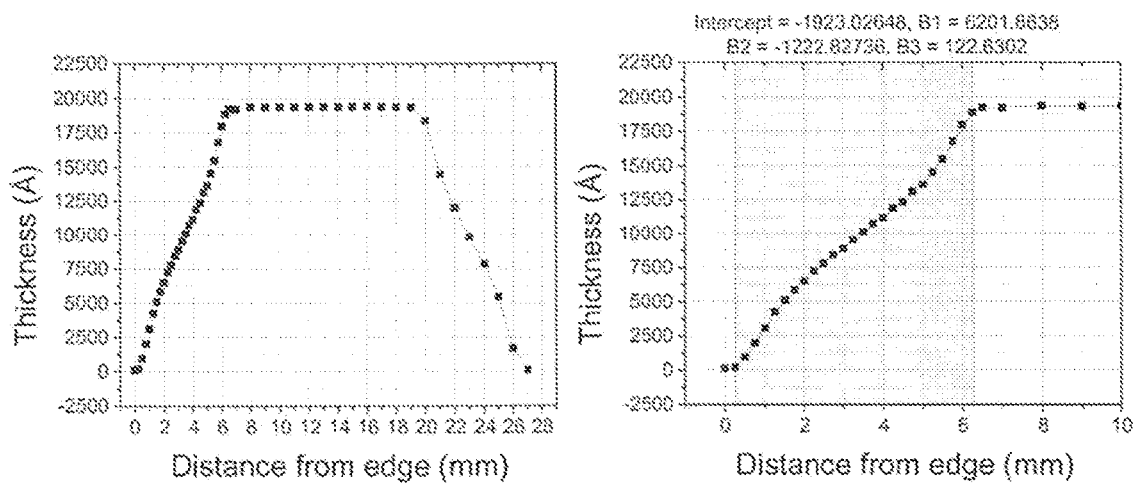
FIG. 6A shows a measured chalcogenide taper profile.
FIG. 6B shows a cubic fit to measured profile.

In order to measure the profile of the taper, the film was scribed parallel to the direction of the taper, and a series of thickness measurements were made via stylus profilometry (KLA-Tencor Alphastep D120) using a 1.0 mg stylus force and a 0.2 mm/s scan speed. The results of the measurement are shown in FIGS. 6A and 6B where FIG. 6A shows the measured taper profile across the entire chalcogenide layer, and FIG. 6B shows a cubic fit to the measured profile along with the fit parameters. The high quality cubic fit indicates that this function can provide an accurate description of the S-shaped taper profile.

Figure 7:
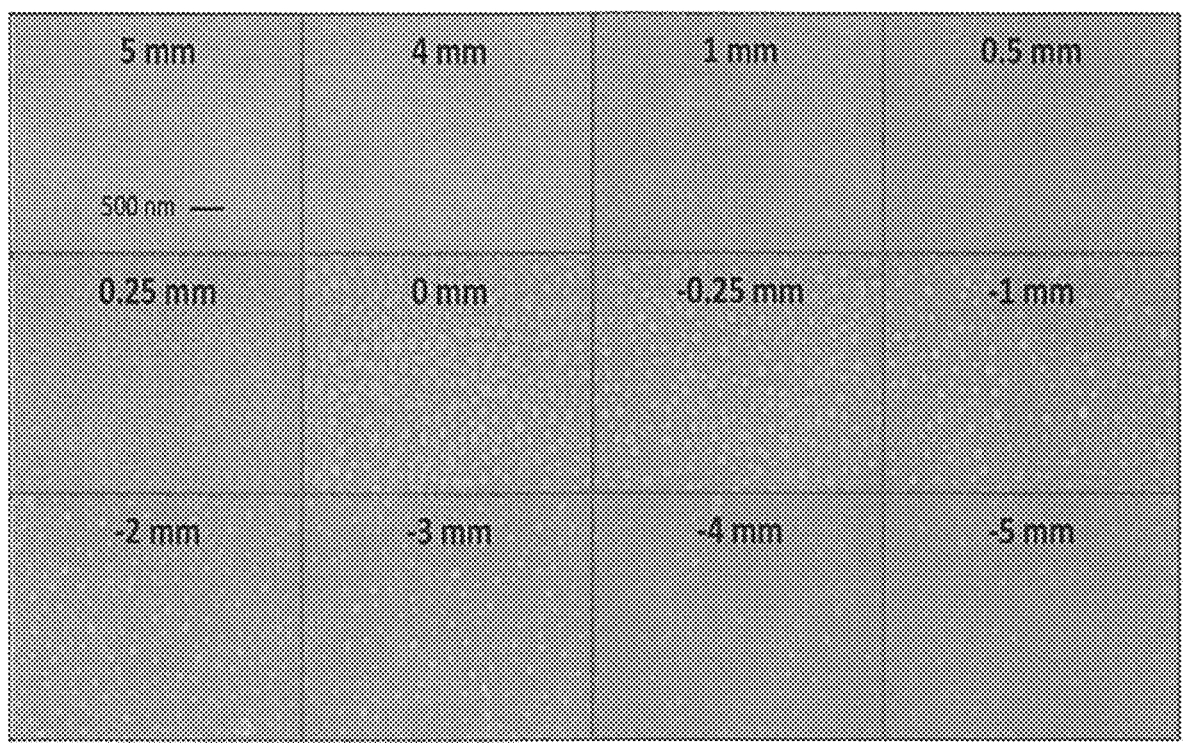
FIG. 7 shows SEM images of chalcogenide taper as a function of position.

One concern with using a shadow mask for the deposition of a taper is the potential formation of nanostructure in the thinner parts of the taper. This nanostructure, which sometimes forms during deposition with a shadow mask, is typically caused by nucleation followed by shadowing from these nuclei. This effect is potentially problematic because it may lead to scatter and optical loss. In order to determine whether nanostructure forms in the case of a chalcogenide glass taper, the same sample described above was evaluated using SEM imaging. FIG. 7 shows a series of images that were taken as a function of distance from the edge of the Mylar mask. In these images, the coordinates for position correspond to those for the measurements shown in FIG. 6. The measurement at 4 mm corresponds to the approximate edge of the mask. As can be seem from the images, no nanostructure is observed near the edge of the mask or until a position of approximately 0.5 mm (3.5 mm under the edge of the mask). At this point, nanostructure becomes apparent. Beyond this point, the structure transitions from agglomerated islands, to distinct islands, to a nearly clean surface with a low density of islands. While nanostructure is dearly present, it is only evident in the portion of the taper that is thinner than 50 nm, and the scale of the features is approximately 200 nm. Given that these dimensions are d/10 for the MWIR, it is likely that these features will not cause significant scattering in the wavelength range of interest.

Figure 8A:
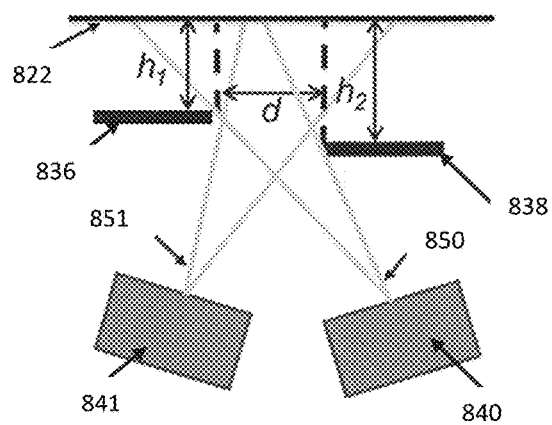
FIGS. 8A-8D show various taper mask geometries.
Figure 8B:
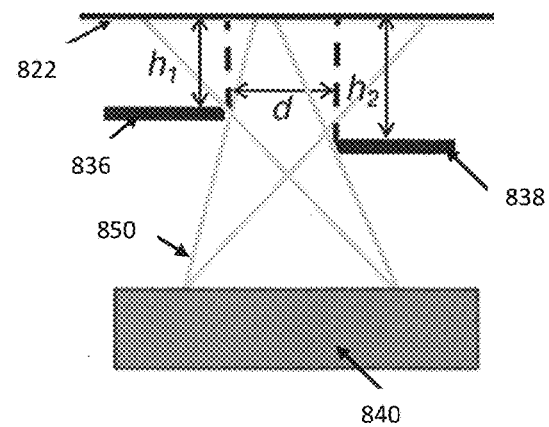
Figure 8C:
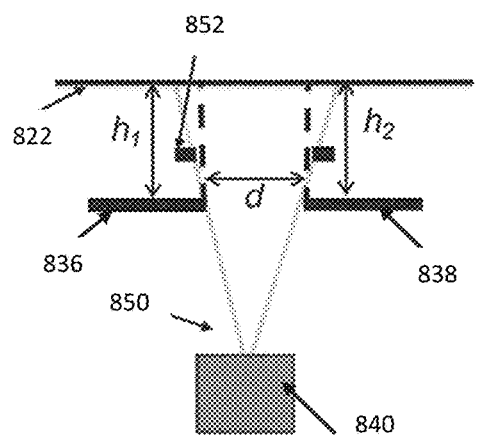
Figure 8D:
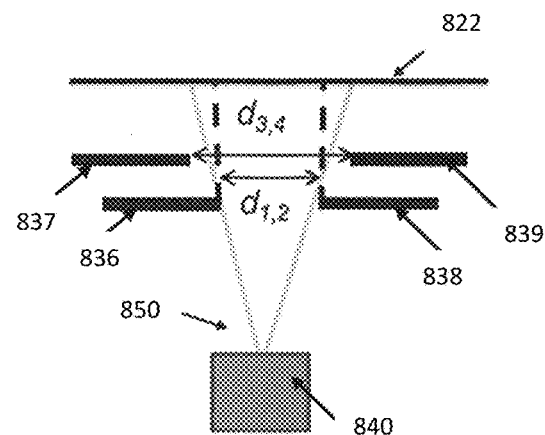

In another embodiment, the mask geometry is more complex than a slit. Some examples are shown in FIGS. 8A-8D. FIG. 8A shows an example in which Mask 1 836 and Mask 2 838 are placed at different heights, h1 and h2 respectively, from the substrate 822. Two different deposition sources, Source 1 840 and Source 2 841, with fluxes of Flux 1 850 and Flux 2 851 are used to deposit chalcogenide glass. This arrangement results in two different taper angles on either side of the substrate 822. FIG. 8B shows an alternative to this arrangement, where instead of two sources, a single, extended source 840 is used. This source 840 is best considered to be a series of point sources, and like the example shown in FIG. 8A will result in two different taper angles on either side of the substrate. FIG. 8C shows an arrangement in which an obstruction 852, such as a bar or a wire, is placed between the substrate 822 and Mask 1 836 at a height <h1 and/or an obstruction 852 is placed between the substrate 822 and Mask 2 838 at a height <h2. This arrangement can alter the shape of the profile, for example, causing a dip in a linear profile or, more generally, causing a non-linear profile. FIG. 8D shows an arrangement in which multiple masks are used; a mask, labeled "Mask 3" 837, is placed between the substrate 822 and Mask 1 836 at a height of h3. A mask, labeled "Mask 4" 839, is placed between the substrate 822 and Mask 2 838 at a height of h4. The spacing between Mask 1 836 and Mask 2 838 is d1,2, and the spacing between Mask 3 837 and Mask 4 829 is d3,4.

This arrangement is most relevant when pressure in the chamber is high, and thus many collisions between particles in the flux occur, resulting in nonlinear particle trajectories between the source and substrate. Like the arrangement shown in FIG. 8C, this may result in a nonlinear taper profile.

Figure 1:
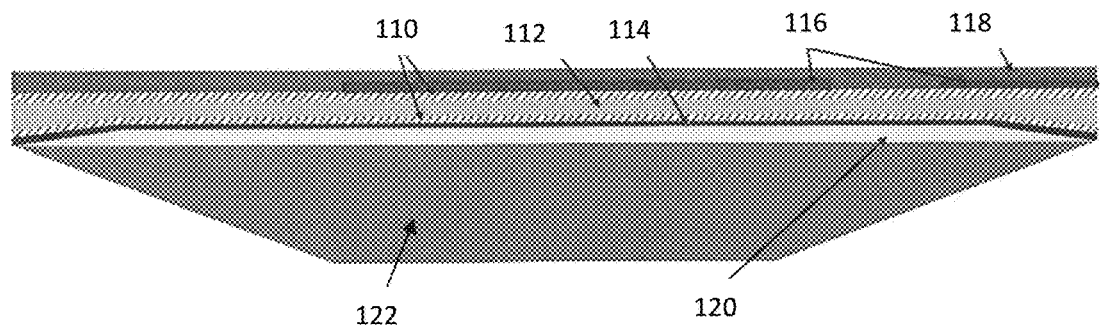
FIG. 1 is a schematic diagram of a preferred embodiment of a steerable electro-evanescent optical refractor (SEEOR).
Figure 2:
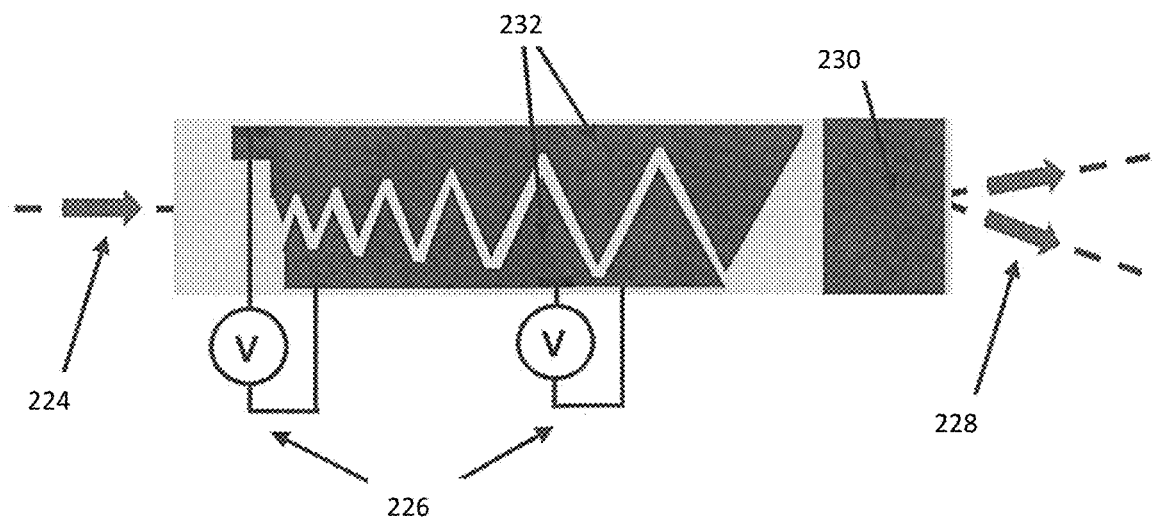
FIG. 2 is a schematic diagram of an in-plane steering mechanism.
Figure 3:
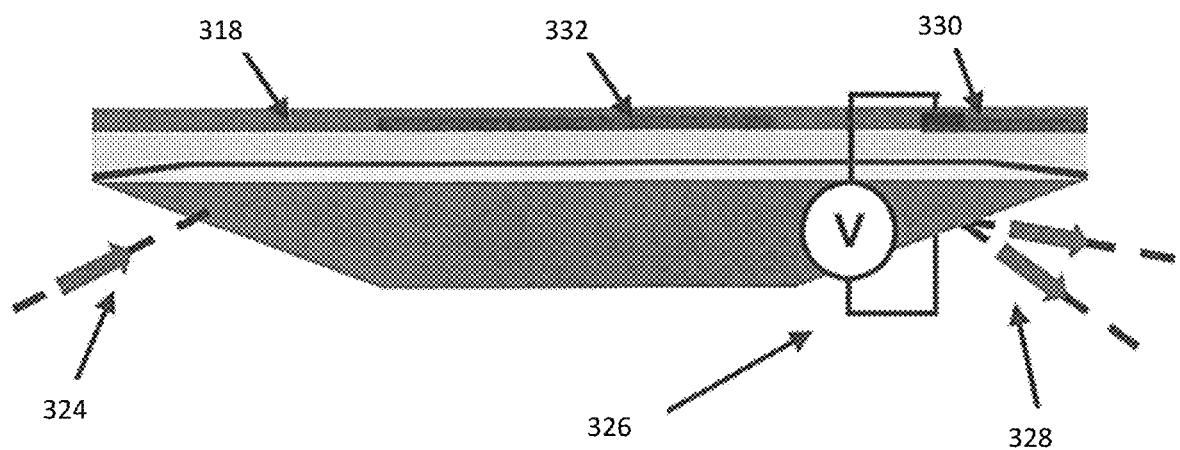
FIG. 3 is a schematic diagram of an out-of-plane steeling mechanism.

In another embodiment of the invention, a tapered chalcogenide film is used as the subcladding in a SEEOR device. The taper angle typically falls in a range between 0.1-20 milliradians. The thickness in the untapered part of the subcladding typically ranges from 1-20 μm. A uniform thickness chalcogenide glass waveguide is deposited on top of the subcladding. The compositions of the chalcogenide glass layers are chosen such that the waveguide core has a higher refractive index than the subcladding. This waveguide structure is then incorporated into a SEEOR that illustrated in FIG. 1.

Figure 9:
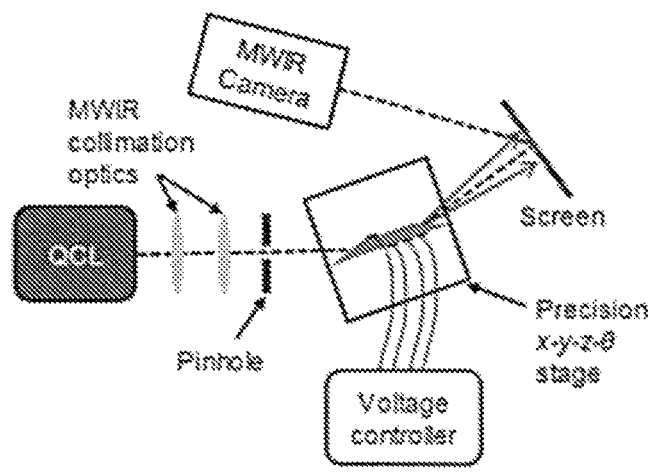
FIG. 9 shows a diagram of the steering characterization setup of a MWIR SEEOR device.

In order to reduce this embodiment to practice, a tapered $As_2S_3$ subcladding was deposited on a conductive, faceted Si substrate using a shadow mask in the manner described above. A uniform-thickness, higher-n, $As_2Se_3$ waveguide core was deposited on top of the subcladding. In this case, the difference in refractive index between the core and cladding was approximately 0.4. The conductive Si substrate served as the bottom electrode. A glass plate, patterned with the top electrodes was positioned at a fixed distance on top of the waveguides using spacers, and an LC cell was formed. FIG. 9 is a diagram of the MWIR characterization setup. The beam from an A=4.6 μm, 40 mW QCL, was conditioned using collimation optics and coupled into the SEEOR via free space coupling. Voltage to the in-plane and out-of-plane steering electrodes was varied from 0-100 V, and the position of the output beam, steered onto a screen, was captured with a MWIR camera.

Figure 10:
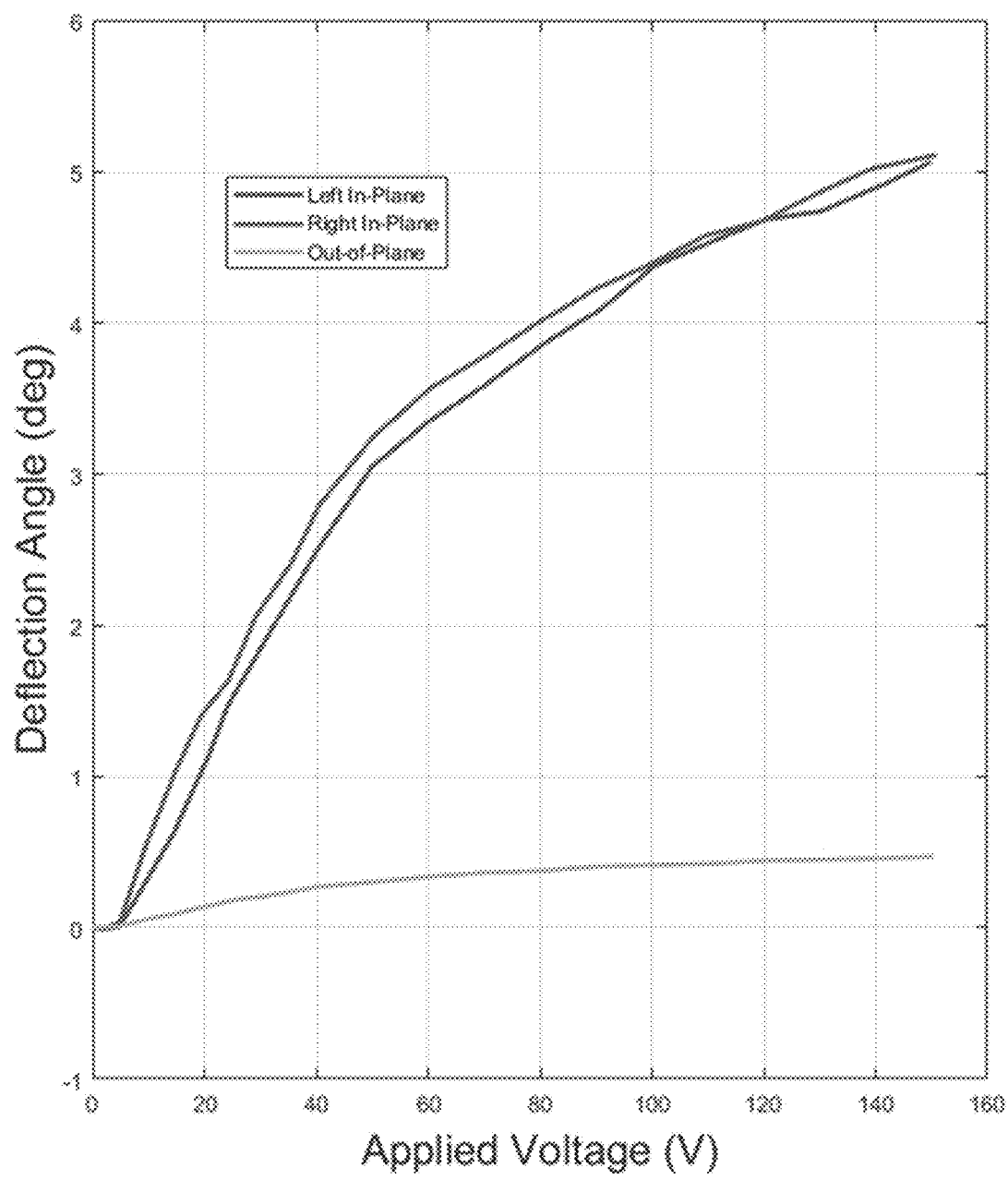
FIG. 10 is a plot showing MWIR beam steering performance.

Measured steering angle, as a function of drive voltage, is shown in FIG. 10. For both in-plane and out-of-plane steering, slope is greater for low voltages and rolls off for higher voltages. For in-plane steering, the maximum steering to the right and left is approximately 5°, for a total in-plane steering range of approximately 10°. The maximum out-of-plane steering is 0.5°. These steering results are an initial demonstration for MWIR NMBS; there is no fundamental issue preventing a steering range as large as that of the SWIR steerer. It is expected that improvements in waveguide and electrode design, together with improvements in LC alignment, will significantly increase this FOR.

In an alternative embodiment, an unfaceted substrate and untapered subcladding may be used. In this case, light may be coupled into and out of the waveguide using prisms.

In another alternative embodiment, the waveguide core comprises chalcogenide glass, but the subcladding is comprises a different material. This material may have a lower refractive index than those available from chalcogenide glasses. The material may be polycrystalline or amorphous. It may be, but is not limited to, one or more of the following materials: $CaF_2$, silicate glass, germinate glass, fluoride glass, and $MgF_2$.

The LC alignment layer at the core/LC interface can be any inorganic or organic thin layer of material that is transparent in the MWIR, capable of aligning LC either through i) a preferred anisotropic molecular interaction or ii) the formation of anisotropic surface features such as nanopillars. The alignment layer will also minimize scattering losses both at the alignment layer itself and any propagation of scattering into the LC experiencing the evanescent field of the guided mode through the waveguide. Examples of inorganic materials include, but are not limited to, $MgF_2$ and ZnS, and organic materials include, but are not limited to, thin layers or monolayers of molecules or molecular mixtures with no significant molecular absorption peaks in the MWIR and either covalently bound to the surface or anisotropically adsorbed to the surface via a method such as photoalignment.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

The invention claimed is:

1. A non-mechanical beam steering device, comprising:
    a substrate, wherein the substrate serves as a bottom electrode;
    a tapered subcladding deposited on the substrate, wherein the tapered subcladding comprises a germinate glass or a fluoride glass;
    a waveguide core deposited on the tapered subcladding, wherein the waveguide core has a higher refractive index than the tapered subcladding, and wherein the waveguide comprises a chalcogenide glass;
    a liquid crystal layer on the waveguide; and
    a glass plate patterned with top electrodes on the liquid crystal layer.

2. The non-mechanical beam steering device of claim 1, wherein the substrate comprises Si.

3. The non-mechanical beam steering device of claim 1, wherein the liquid crystal layer comprises $MgF_2$, ZnS, or any combination thereof.

4. The non-mechanical beam steering device of claim 1, wherein the liquid crystal layer comprises an organic material that is transparent in the midwave infrared.

5. The non-mechanical beam steering device of claim 1, wherein the tapered subcladding has a taper angle between 0.1 and 20 milliradians.

* * * * *